United States Patent [19]
Lindsley et al.

[11] Patent Number: 5,305,246
[45] Date of Patent: Apr. 19, 1994

[54] DEVICE AND METHOD FOR EVALUATING INVERSE TRIGONOMETRIC FUNCTIONS

[76] Inventors: Brett L. Lindsley, 242 North Ave., Highwood, Ill. 60040; Darleen J. Stockley, Rte. #2, Earlville, Ill. 60518

[21] Appl. No.: 5,853

[22] Filed: Jan. 15, 1993

Related U.S. Application Data

[63] Continuation of Ser. No. 924,354, Jul. 31, 1992, abandoned, which is a continuation of Ser. No. 555,324, Jul. 19, 1990, abandoned.

[51] Int. Cl.$^5$ ............................................. G06F 15/31
[52] U.S. Cl. ........................................................ 364/729
[58] Field of Search ................................. 364/729, 721

[56] References Cited

U.S. PATENT DOCUMENTS

| | | | |
|---|---|---|---|
| 4,164,022 | 8/1979 | Rattlingourd | 364/729 |
| 4,899,302 | 2/1990 | Nakayama | 364/729 |
| 4,956,799 | 9/1990 | Nakayama | 364/729 |

*Primary Examiner*—David H. Malzahn

[57] ABSTRACT

A method and device are provided for processing an input value to provide an output inverse trigonometric function value of the input value. It substantially comprises a method and device for modifying the input value to obtain an approximation value, determining at least one correction factor, generating at least one intermediate function value, being substantially an inverse trigonometric function value of the approximation value, and combining the intermediate function value with at least one correction factor to determine an output inverse trigonometric function value.

33 Claims, 2 Drawing Sheets

DEVICE AND METHOD FOR EVALUATING INVERSE TRIGONOMETRIC FUNCTIONS

This is a continuation of application Ser. No. 07/924,354, filed Jul. 31, 1992 and now abandoned which in turn is a continuation of application Ser. No. 07/555,324, filed Jul. 19, 1990 and now abandoned.

FIELD OF THE INVENTION

This invention is concerned with transcendental function evaluation (TFE). More particularly, this invention is concerned with a method and device for digital signal processing evaluation of inverse trigonometric functions.

BACKGROUND OF THE INVENTION

Algorithms for computing sine, cosine, and tangent functions have been developed. Volder formulated a CORDIC algorithm to utilize hardware implementation for evaluating trigonometric functions, that algorithm making use of a special sequential arithmetic unit for implementing a prescribed sequence of conditional additions or subtractions for evaluating trigonometric functions.

The CORDIC algorithm was generalized by Walther, in *A Unified Algorithm For Elementary Functions*, Spring Joint Computer Conference, 1971. The CORDIC algorithm is utilized typically for fixed point arithmetic implementation of sine, cosine, and tangent functions, but generally is more difficult to apply to computation of inverse trigonometric functions. There is a need for fast, efficient determination of inverse trigonometric functions.

SUMMARY OF THE INVENTION

A method and device are set forth for substantially processing an input value to provide a fast and efficient determination of an output inverse trigonometric function value of the input value. Responsive to the input value, a modifier determines an approximation value of the input value and a function generator determines an intermediate function value, generally being at least one inverse trigonometric function value of the approximation value. A correction factor generator utilizes the input value and the approximation value to generate at least one correction value. A combiner combines at least the one correction value and the at least one intermediate function value to provide at least one output inverse trigonometric function value of the input value.

BEST MODE FOR CARRYING OUT THE INVENTION

Figure 1A:
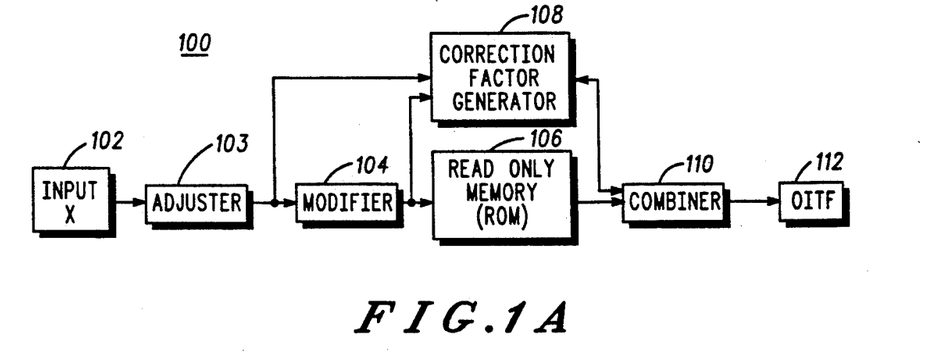
FIG. 1A is a block diagram of a computer hardware implementation of the present invention.

FIG. 1A, generally depicted by the numeral 100, illustrates one embodiment of a computer hardware implementation of the present invention utilizing fast and efficient determination of at least one correction value and at least one function value that are combined to provide at least one trigonometric inverse function value of an input value.

An input value x (102) is coupled to a modifier (104) that generates an approximation value, a, of the input value such that the approximation value is selected from a predetermined set of values in a read-only memory, said values being predetermined by preselected rounding algorithms. A first function generator (106), coupled to the modifier, utilizes at least one first memory device, generally a first ROM, to generate at least one trigonometric inverse function value of the approximation value, being substantially an intermediate value. Typically, the at least one trigonometric inverse function value is at least one of: an inverse sine value (asine) and an inverse cosine value (acosine). It will be obvious to one skilled in the art that, in an alternative implementation, a CORDIC algorithm may be utilized to generate a trigonometric inverse function value, but that such an implementation would result in a lower rate of such value determination.

Figure 1B:
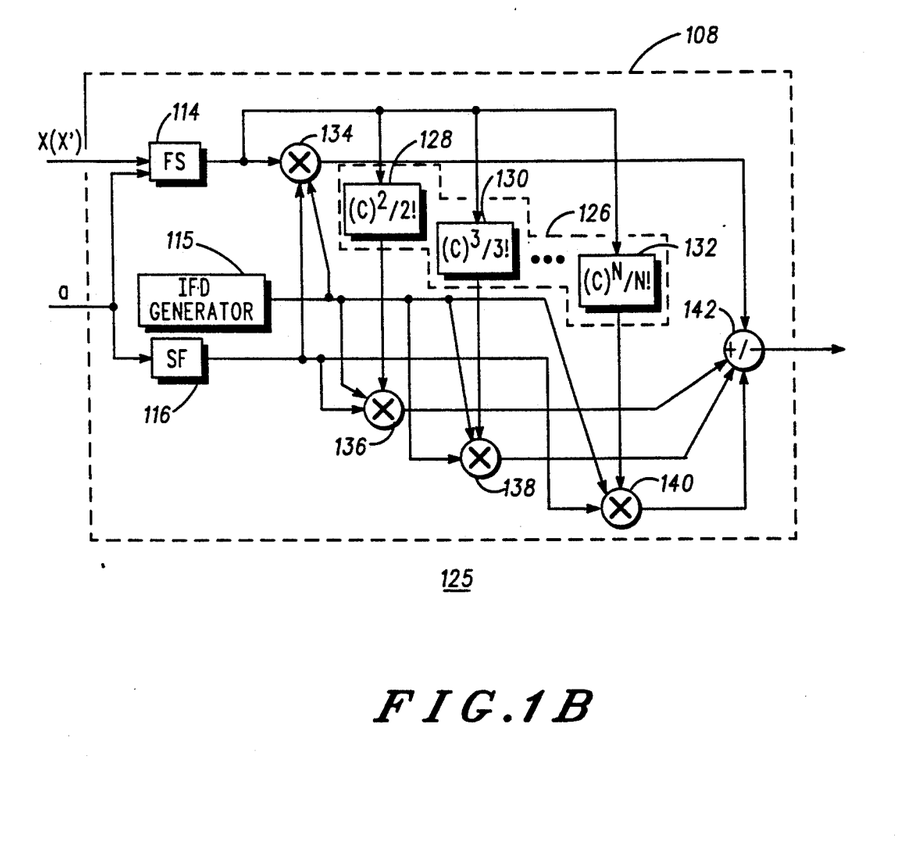
FIG. 1B is a block diagram setting forth one computer hardware implementation of a correction factor generator in accordance with the present invention.

The input value is further coupled to a correction factor generator (108), set forth in one selected implementation in FIG. 1B, numeral 125, that utilizes a first subtractor (FS)(114) that is coupled to the modifier (104) and to the input (102) to determine a first difference of the input value minus the approximation value, substantially $c = x - a$, c being an error value. The correction factor generator (108) further includes a scaling factor generator (116) coupled to the modifier (104) that generally utilizes at least one second memory device and the approximation value to determine at least one first scaling factor (116), being substantially $$SF = \frac{1}{\sqrt{1 - a^2}}.$$

A second multiplier (134), coupled to the FS and to the SF output of the scaling factor generator, determines a second product of the error value and the first scaling factor. It will be obvious to one skilled in the art that a single memory device may be utilized in place of the two memory devices implemented herein.

In addition, a trigonometric inverse function derivative generator (IFD) (115), coupled to the modifier (104), provides secondary scaling factors, substantially being a set summed terms of $D_{col,row}$ scaling factors in accordance with the concept of the following table:

| | $D_1$ | | $D_2$ | | $D_3$ | | $D_4$ | | ... | |
|---|---|---|---|---|---|---|---|---|---|---|
| n | f | a | b | a | c | a | d | a | ... | ... |
| 1 | 1 | $a^0$ | | | | | | | | |
| 2 | 1 | $a^1$ | | | | | | | | |
| 3 | 3 | $a^2$ | 1 | $a^0$ | | | | | | |
| 4 | 15 | $a^3$ | 9 | $a^1$ | | | | | | |
| 5 | 105 | $a^4$ | 90 | $a^2$ | 9 | $a^0$ | | | | |
| 6 | 945 | $a^5$ | 1050 | $a^3$ | 225 | $a^1$ | | | | |
| 7 | 10395 | $a^6$ | 14175 | $a^4$ | 4725 | $a^2$ | 225 | $a^0$ | | |
| 8 | 135135 | $a^7$ | 218295 | $a^5$ | 99225 | $a^3$ | 11025 | $a^1$ | | |

-continued

| | $D_1$ | | $D_2$ | | $D_3$ | | $D_4$ | | |
|---|---|---|---|---|---|---|---|---|---|
| n | f | a | b | a | c | a | d | a | ... ... |
| . | . | . | . | . | . | . | . | . | ... ... |
| . | . | . | . | . | . | . | . | . | ... ... |
| . | . | . | . | . | . | . | . | . | ... ... |
| n | $f_n$ | $a^{n-1}$ | $b_n$ | $a^{n-3}$ | $c_n$ | $a^{n-5}$ | $d_n$ | $a^{n-7}$ | ... ... | where, beginning as shown in the table, and progressing, each coefficient$_{row}$ is as follows:

$$f_n = (f_{n-1})(2n - 3) \quad \text{for } n \geq 2,$$

$$b_n = (f_{n-1})\left(\sum_{y=1}^{n-2} \frac{y}{1}\right),$$

$$c_n = (b_{n-1})\left(\sum_{y=2}^{n-3} \frac{y}{2}\right),$$

$$d_n = (c_{n-1})\left(\sum_{y=3}^{n-4} \frac{y}{3}\right),$$

where table entry of a coefficient together with its a term is identified by the col, row portion of each $D_{col,row}$, a power of each a term of a $D_{col,row}$ is determined as follows: $a^{\{n+1-2(D\,col\,\#)\}}$, where the $D_{col,row}$ set of terms follows the following form:

For odd table rows:

$$f_n a^{n-1}, b_n a^{n-3}, c_n a^{n-5}, d_n a^{n-7}, \ldots, m_n a^0$$

For even table rows:

$$f_n a^{n-1}, b_n a^{n-3}, c_n a^{n-5}, d_n a^{n-7}, \ldots, (m+1)_n a^1$$

where m and m+1 represent desired selected odd and even columns for $D_{col,row}$ scaling factors, n being a number of an nth correction value, and further, where each successive composite table term $D_{col,row}$ is divided respectively by denominators for odd and even numbered correction value terms as set forth below, thereby providing $D_{col,row}$ scaling factor terms, the terms being summed to provide a summed set of $D_{col,row}$ terms, and such that each $D_{col,row}$ scaling factor term of the summed set of $D_{col,row}$ terms utilized in correction factor determination is of a general form: a numerator as provided by the table and scheme set forth above, and successive denominators for each numerator term of the general form:

For odd numbered correction value terms, the following denominators:

$$(1-a^2)^{n-1}, (1-a^2)^{n-2}, (1-a^2)^{n-3}, \ldots,$$
$$(1-a^2)^{(n-1)/2}$$

For even number correction value terms, the following denominators:

$$(1-a^2)^{n-1}, (1-a^2)^{n-2}, (1-a^2)^{n-3}, \ldots, (1-a^2)^{n/2}$$

such that the set of summed $D_{col,row}$ terms is substantially:

$$\frac{f_n a^{n-1}}{(1-a^2)^{n-1}} + \frac{b_n a^{n-3}}{(1-a^2)^{n-2}} + \frac{c_n a^{n-5}}{(1-a^2)^{n-3}} + \ldots.$$

Where desired, at least one power and factorial determiner (128, 130, . . . 132), coupled to the FS (114) determines at least one c scaling factor of c to a power that follows the form $c^n$, and further determines a reciprocal of at least one factorial factor, substantially $1/n!$, where n for both of those terms is a row of the $D_{col,row}$ secondary scaling factor where n=row# as well as the number of the correction value terms, multiplying those factors to obtain a net term of $c^n/n!$, the 0th term being the inverse trigonometric function value of the approximation value, such that each correction value term to be added to a 0th term of n terms is substantially determined by at least one of:

utilizing further multipliers (136, 138, . . . 140), coupled to the respective power and factorial determiners (126) (128, 130, . . . , 132), to the scaling factor generator (116), and to the IFD generator (115), to multiply the terms: $c^n/n!$, SF, and the set of summed terms of $D_{col,row}$ as set forth above to obtain, if desired, at least a third product, and, if desired, further products; and utilizing a second combiner (142) to determine at least a third sum of at least one of:

the second product, the third product and further products; and assigning that third sum a sign of: positive for a selected inverse sine value determination, positive for a selected inverse tangent determination, and negative for a selected inverse cosine determination, thereby providing a signed third sum.

The first function generator (106) substantially determines an inverse sine of an approximation value for a desired determination of an inverse sine of an input, respectively, and an inverse cosine of an approximation value for a desired determination of an inverse cosine of an input.

The correction factor generator (108) and the first function generator (106) are coupled to a combiner (110) such that the combiner (110) adds the signed third sum to the intermediate value to obtain a fourth sum, OITF (112), being substantially at least one inverse trigonometric function value of the input value. Typically, the OITF (112) is one of a trigonometric inverse sine value (asine) of the input value, a trigonometric inverse cosine value (acosine) of the input value, and a trigonometric inverse tangent value (atangent) of the input value.

It is clear that the multiplication of factors and terms of the correction factor may be in any desired order, and that the determination of the powers of the error value and the inverse factorials may be accomplished separately.

Further, when an output inverse tangent value of the input value is desired, an adjusting factor determiner (ADJUSTER) (103) is further coupled between the input (102) and each of the modifier (104) and the correction factor generator (108) as set forth in FIG. 1, for determining a fourth product, x', such that the fourth product is substantially the input value multiplied by a factor determined by obtaining a reciprocal of a square root value of a sum of one and a square of the input value, the fourth product substantially being $$x' = \frac{x}{\sqrt{1 + x^2}},$$

where x is the input value, and such that the fourth product is substantially an adjusted input value for the modifier (104) and the correction factor generator (108) in place of the input value (102).

A number of correction values to be combined with the intermediate value is predetermined according to a desired degree of accuracy. Utilizing addition of one correction value approximately doubles an accuracy of an asine determination. It will clear to one skilled in the art that a precision and an accuracy of a memory device utilized to determine an intermediate value must be at least as precise and as accurate as a desired accuracy of a desired output inverse trigonometric function value.

For example, an inverse sine function output value of an input value x is substantially determined by the following general form:

$$asine(x) = asine(a) + \frac{(c)(D_{1,1})(SF)}{1!} + \frac{(c^2)(d_{1,2})(SF)}{2!} +$$

$$\frac{(c^3)(SF)(D_{1,3} + D_{2,3})}{3!} + \frac{(c^4)(SF)(D_{1,4} + D_{2,4})}{4!} +$$

$$\frac{(c^5)(SF)(D_{1,5} + D_{2,5} + D_{3,5})}{5!} + \frac{(c^6)(SF)(D_{1,6} + D_{2,6} + D_{3,6})}{6!} +$$

$$\ldots + \frac{(c^n)(SF)(D_{col,row} \text{ set of terms})}{n!},$$

which form is equivalent to:

$$asine(x) = asine(a) + (x - a)(1/1!)\left(\frac{1}{\sqrt{1 - a^2}}\right)\left(\frac{1}{1}\right) +$$

$$(x - a)^2(1/2!)\left(\frac{1}{\sqrt{1 - a^2}}\right)\left(\frac{1a^1}{(1 - a^2)}\right) +$$

$$(x - a)^3(1/3!)\left(\frac{1}{\sqrt{1 - a^2}}\right)\left(\frac{3a^2}{(1 - a^2)^2} + \frac{1}{(1 - a^2)}\right) +$$

$$(x - a)^4(1/4!)\left(\frac{1}{\sqrt{1 - a^2}}\right)\left(\frac{15a^3}{(1 - a^2)^3} + \frac{9a}{(1 - a^2)^2}\right) +$$

$$\ldots + (x - a)^n(1/n!)\left(\frac{1}{\sqrt{1 - a^2}}\right)(\text{nth } D_{col,row} \text{ set of terms}),$$

such that a desired degree of accuracy may be selected for an inverse sine function value of an input value by selecting an appropriate number of correction factors.

For implementation of an acosine(x) determination within a hardware implementation in line with that of the asine(x) implementation, the $D_{col,row}$ terms are all given a negative value, an acosine(a) value is determined from a function generator for acosine values, and the remaining determination is substantially identical to that of the asine(x) determination.

It is clear that determination of $D_{1,1}$ may be omitted since the value of that factor is 1, as may be other factors substantially equal to one.

Figure 2:
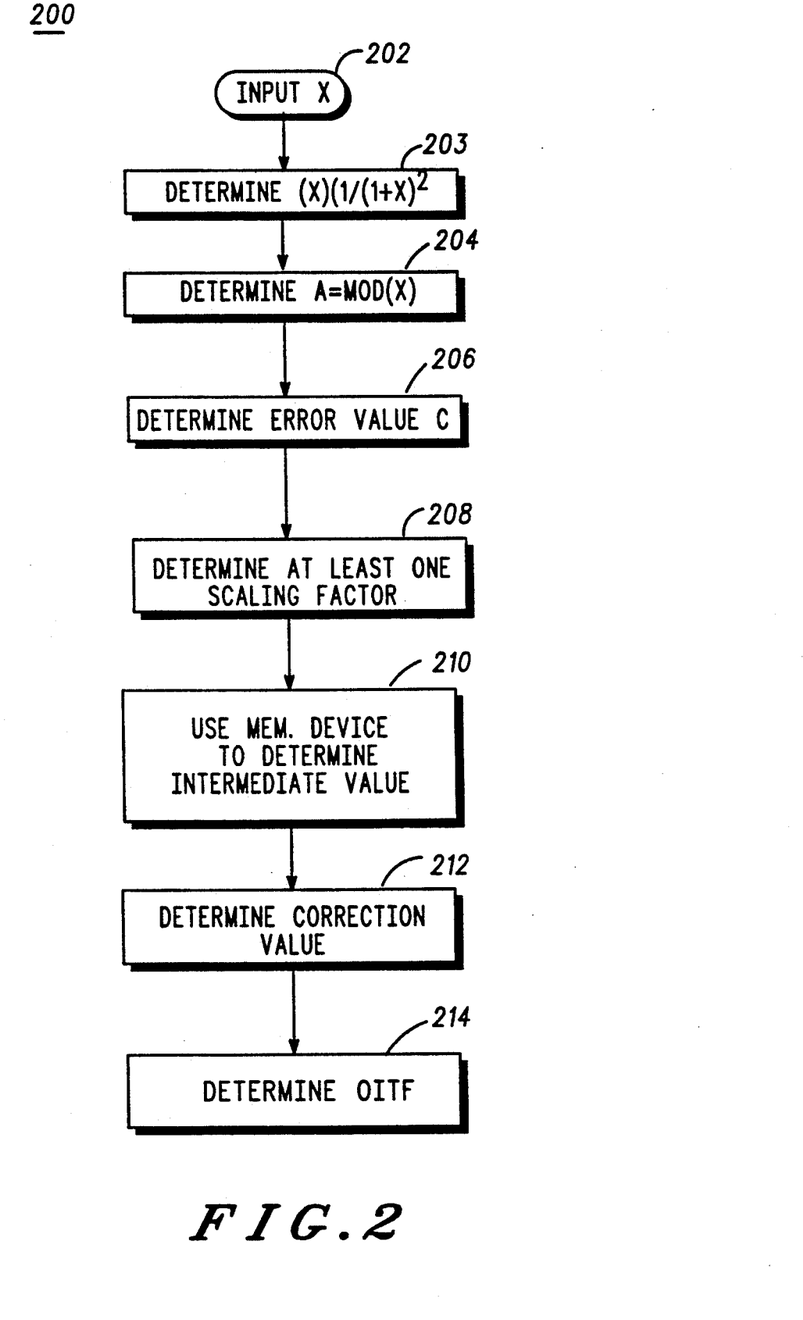
FIG. 2 is a general flow chart of an implementation of the method of the present invention.

FIG. 2, numeral 200, sets forth a general flow chart of an implementation of the method of the present invention. A value x is input (202). An approximation value, a, of the input value is determined (204) as set forth above. An error value, c, is determined (206), substantially being x−a. At least one scaling factor is determined (208) as set forth above. A memory device, typically a ROM, is utilized to determine an intermediate value (210). At least one correction value is determined (212), and at least the one correction value is combined with the intermediate value to determine at least one OITF (214), each as previously set forth, including an alternative implementation of a step of determining acosine (x) by a translation subtraction, substantially being π/2−asine(x). Where an output inverse tangent value of an input value is desired, a step of multiplying the input value x by an adjusting factor (203), $$\frac{1}{\sqrt{1 + x^2}},$$

is included immediately after inputting a value.

Alternatively, it is clear that an asine(x) may be utilized to determine an acosine(x) value by a translational subtraction of the asine(x) value, π/2-asine(x).

We claim:

1. A device for processing an input value to provide at least one inverse trigonometric function value of the input value, comprising:
   A) modification means responsive to the input value for determining an approximation value of the input value;
   B) error generating means responsive to the modification means and the input value for generating an error value;
   C) a read-only memory (ROM) responsive to the modification means for generating at least a first scaling factor, the first scaling factor being substantially equal to $$\frac{1}{\sqrt{1 - a^2}} \text{ where } a \text{ is the approximation value;}$$

where a is the approximation value;
   D) function generating means responsive to the modification means for determining an intermediate value;
   E) correction factor generating means responsive to the error generating means, the modification means, and the read-only memory for determining at least one correction value; and
   F) first combining means responsive to the function generating means and correction factor generating means for determining at least one output inverse trigonometric function value of the input value.

2. The device of claim 1, wherein the approximation value is selected from a predetermined set of values.

3. The device of claim 2, wherein the predetermined set of values is a group of values predetermined by selected rounding algorithms.

4. The device of claim 1, wherein the error generating means includes first subtraction means for determining a first difference of the input value minus the approximation value, the first difference substantially being an error value.

5. The device of claim 1, wherein the function generating means utilizes at least one second memory device to substantially determine at least one inverse trigonometric function value of the approximation value.

6. The device of claim 5, wherein the at least one inverse trigonometric function value is at least one of: an inverse sine value of the approximation value and an inverse cosine value of the approximation value.

7. The device of claim 5, wherein the at least one second memory device is a second ROM.

8. The device of claim 1, wherein the correction factor generating means includes at least two of:
   A) second multiplication means, responsive to the error generating means and the read-only memory (ROM) for substantially determining a second product of the error value and the first scaling factor;
   B) second scaling factor generating means for substantially determining at least one of a set of scaled factors;
   C) power and factorial determining means for determining at least one of a set of power values of the error value and at least one reciprocal of a factorial value of n where n is a number of correction factor terms, and for determining an intermediate product, $c^n/n!$, thereof;
   D) secondary factor determining means for determining, where desired, at least one secondary factor $D_{col,row}$, where $D_{col,row}$ is substantially an inverse trigonometric function derivative for a selected inverse trigonometric function value such that a numerical position number of a correction factor equals the number of the derivative;
   E) third multiplication means, responsive to the power and factorial determining means and the second scaling factor generating means for substantially determining, if desired, at least a third product of at least one intermediate product ($c^n/n!$), a scaled factor (SF), and, where desired, a secondary factor being a set summed terms of $D_{col,row}$ scaling factors in accordance with the concept of the following table:

|   | $D_1$ |   | $D_2$ |   | $D_3$ |   | $D_4$ |   | ... |   |
|---|---|---|---|---|---|---|---|---|---|---|
| n | f | a | b | a | c | a | d | a | ... | ... |
| 1 | 1 | $a^0$ |  |  |  |  |  |  |  |  |
| 2 | 1 | $a^1$ |  |  |  |  |  |  |  |  |
| 3 | 3 | $a^2$ | 1 | $a^0$ |  |  |  |  |  |  |
| 4 | 15 | $a^3$ | 9 | $a^1$ |  |  |  |  |  |  |
| 5 | 105 | $a^4$ | 90 | $a^2$ | 9 | $a^0$ |  |  |  |  |
| 6 | 945 | $a^5$ | 1050 | $a^3$ | 225 | $a^1$ |  |  |  |  |
| 7 | 10395 | $a^6$ | 14175 | $a^4$ | 4725 | $a^2$ | 225 | $a^0$ |  |  |
| 8 | 135135 | $a^7$ | 218295 | $a^5$ | 99225 | $a^3$ | 11025 | $a^1$ |  |  |
| . | . | . | . | . | . | . | . | . | ... | ... |
| . | . | . | . | . | . | . | . | . | ... | ... |
| . | . | . | . | . | . | . | . | . | ... | ... |
| n | $f_n$ | $a^{n-1}$ | $b_n$ | $a^{n-3}$ | $c_n$ | $a^{n-5}$ | $d_n$ | $a^{n-7}$ | ... | ... | where, beginning as shown in the table, and progressing, each coefficient$_{row}$ is as follows:

$$f_n = (f_{n-1})(2n - 3) \quad \text{for } n \geq 2,$$

$$b_n = (f_{n-1})\left(\sum_{y=1}^{n-2} \frac{y}{1}\right),$$

$$c_n = (b_{n-1})\left(\sum_{y=2}^{n-3} \frac{y}{2}\right),$$

$$d_n = (c_{n-1})\left(\sum_{y=3}^{n-4} \frac{y}{3}\right),$$

where table entry of a coefficient together with its a term is identified by $D_{col,row}$, a power of each a term of a $D_{col,row}$ is determined as follows: $a^{\{n+1-2(D\ col\ \#)\}}$, where the $D_{col,row}$ set of terms follows the following form:

For odd table rows:

$f_n a^{n-1}, b_n a^{n-3}, c_n a^{n-5}, d_n a^{n-7}, \ldots, m_n a^0$

For even table rows:
$f_n a^{n-1}, b_n a^{n-3}, c_n a^{n-5}, d_n a^{n-7}, \ldots, (m+1)_n a^1$ where m and m+1 represent desired selected odd and even columns for $D_{col,row}$ scaling factors, n being a number of an nth correction value, and further, where each successive composite table term $D_{col,row}$ is divided respectively by denominators for odd and even numbered correction value terms as set forth below, thereby providing $D_{col,row}$ scaling factor terms, the terms being summed to provide a summed set of $D_{col,row}$ terms, and such that each $D_{col,row}$ scaling factor term of the summed set of $D_{col,row}$ terms utilized in correction factor determination is of a general form: a numerator as provided by the table and scheme set forth above, and successive denominators for each numerator term of the general form:

For odd numbered correction value terms, the following denominators:

$(1-a^2)^{n-1}, (1-a^2)^{n-2}, (1-a^2)^{n-3}, \ldots,$
$(1-a^2)^{(n-1)/2}$

For even number correction value terms, the following denominators:
$(1-a^2)^{n-1}, (1-a^2)^{n-2}, (1-a^2)^{n-3}, \ldots, (1-a^2)^{n/2},$ such that the set of summed $D_{col,row}$ terms is substantially:

$$\frac{f_n a^{n-1}}{(1-a^2)^{n-1}} + \frac{b_n a^{n-3}}{(1-a^2)^{n-2}} + \frac{c_n a^{n-5}}{(1-a^2)^{n-3}} + \cdots;$$

and

F) second combining means responsive to the second multiplication means and the third multiplication means for substantially determining a third sum of at least one of: the second product, the third product and any product determined by the third multiplication means and for assigning that third sum a sign of: positive for a selected inverse sine value determination, and negative for a selected inverse cosine value determination, thereby substantially obtaining a signed third sum.

9. The device of claim 8 further including that the first combining means includes at least fourth addition means for determining a fourth sum of at least one intermediate value and the signed third sum, that fourth sum being substantially at least one inverse trigonometric function value of the input value.

10. The device of claim 9, wherein the fourth sum is substantially at least one of: an inverse sine value of the input value, an inverse cosine value of the input value, and where an adjusting factor determiner is further included operably coupled between the input and the modification means, an inverse tangent value of the input value.

11. The device of claim 1, wherein, when an output inverse tangent value of the input value is desired, an adjusting factor means responsive to the input means is further included for determining a fourth product such that the fourth product is substantially the input value multiplied by a factor determined by obtaining a reciprocal of a square root value of a sum of one and a square of the input value, the fourth product substantially being $$\frac{x}{\sqrt{1+x^2}},$$

where x is the input value, and such that the fourth product is substantially an adjusted input value for the modification means and the error generating means in place of the input value.

12. A device for carrying out a prescribed digital signal processing operation on at least one input signal, a respective value of which is provided in digitally encoded format as a first at least one bit digital signal code, to provide at least one desired function value of the respective value of the at least one input signal in a digitally encoded format as a second at least one bit digital signal code, comprising:

first means, coupled to receive said first at least one bit digital signal code, for generating an approximation value of the input value in a digitally encoded format as a third at least one bit digital signal code and providing the approximation value over respective bit lines of a multibit approximation value output link;

second means, coupled to receive said first at least one bit digital signal code and coupled to the multibit approximation output link, for generating an error value in a digitally encoded format as a fourth at least one bit digital signal code and providing the error value over respective bit lines of a multibit error generator value output link;

a read-only memory (ROM), coupled to the multibit approximation output link lines, wherein the read-only memory (ROM) obtains at least a first scaling factor, the first scaling factor being substantially equal to $$\frac{1}{\sqrt{1-a^2}},$$

where a is the approximation value, for determining at least a first scaling factor output value in a digitally encoded format as a fifth at least one bit digital signal code and providing the at least first scaling factor output value over multibit scaling factor output link lines;

third means, coupled to the multibit approximation output link lines, for determining at least a first function output value in a digitally encoded format as a sixth at least one bit digital signal code and providing the at least first function output value over multibit function value output link lines;

fourth means, coupled to the multibit error generator output link lines, the multibit scaling factor output link lines, and the multibit approximation output link lines, for determining at least a first correction factor in a digitally encoded format as a seventh at least one bit digital signal code and providing the at least first correction factor over multibit correction value output link lines;

fifth means, coupled to the multibit correction value output link lines, for combining at least the at least first function output and the at least first correction factor to determine at least one output inverse trigonometric function value of the respective value of the at least one input signal in a digitally encoded format.

13. The device of claim 12, wherein the approximation value is selected from a predetermined set of values.

14. The device of claim 13, wherein the predetermined set of values is a group of values predetermined by selected rounding algorithms.

15. The device of claim 12, wherein the second means includes at least first subtraction means for determining a first difference of the respective value of the at least one input signal minus the approximation value, the first difference substantially being an error value.

16. The device of claim 12, wherein the third means utilizes at least one second memory device to substantially determine at least one inverse trigonometric function value of the approximation value.

17. The device of claim 16, wherein the at least one inverse trigonometric function value is at least one of: an inverse sine value of the approximation value and an inverse cosine value of the approximation value.

18. The device of claim 16, wherein the at least one second memory device is a second ROM.

19. The device of claim 12, wherein the fourth means includes at least two of:

A) second multiplication means, responsive to the error generating means and the read-only memory (ROM) for substantially determining a second product of the error value and the first scaling factor;

B) second scaling factor generating means for substantially determining at least one of a set of scaled factors;

C) power and factorial determining means for determining at least one of a set of power values of the error value and at least one reciprocal of a factorial value of n where n is a number of correction factor terms, and for determining an intermediate product, $c^n/n!$, thereof;

D) secondary factor determining means for determining at least one secondary factor $D_{col,row}$, where $D_{col,row}$ is substantially an inverse trigonometric function derivative for a selected inverse trigonometric function value such that a numerical position number of a correction factor equals the number of the derivative;

E) third multiplication means, responsive to the power and factorial determining means and the second scaling factor generating means for substantially determining, if desired, at least a third product of at least one intermediate product ($c^n/n!$), a scaled factor (SF), and, where desired, a secondary factor being a set summed terms of $D_{col,row}$ scaling factors in accordance with the concept of the following table:

|   | $D_1$ |   | $D_2$ |   | $D_3$ |   | $D_4$ |   | ... |   |
|---|---|---|---|---|---|---|---|---|---|---|
| n | f | a | b | a | c | a | d | a | ... | ... |
| 1 | 1 | $a^0$ |  |  |  |  |  |  |  |  |
| 2 | 1 | $a^1$ |  |  |  |  |  |  |  |  |
| 3 | 3 | $a^2$ | 1 | $a^0$ |  |  |  |  |  |  |
| 4 | 15 | $a^3$ | 9 | $a^1$ |  |  |  |  |  |  |
| 5 | 105 | $a^4$ | 90 | $a^2$ | 9 | $a^0$ |  |  |  |  |
| 6 | 945 | $a^5$ | 1050 | $a^3$ | 225 | $a^1$ |  |  |  |  |
| 7 | 10395 | $a^6$ | 14175 | $a^4$ | 4725 | $a^2$ | 225 | $a^0$ |  |  |
| 8 | 135135 | $a^7$ | 218295 | $a^5$ | 99225 | $a^3$ | 11025 | $a^1$ |  |  |
| . | . | . | . | . | . | . | . | . | ... | ... |
| . | . | . | . | . | . | . | . | . | ... | ... |
| . | . | . | . | . | . | . | . | . | ... | ... |
| n | $f_n$ | $a^{n-1}$ | $b_n$ | $a^{n-3}$ | $c_n$ | $a^{n-5}$ | $d_n$ | $a^{n-7}$ | ... | ... | where, beginning as shown in the table, and progressing, each coefficient$_{row}$ is as follows:

$$f_n = (f_{n-1})(2n - 3) \quad \text{for } n \geq 2,$$

$$b_n = (f_{n-1})\left(\sum_{y=1}^{n-2} \frac{y}{1}\right),$$

$$c_n = (b_{n-1})\left(\sum_{y=2}^{n-3} \frac{y}{2}\right),$$

$$d_n = (c_{n-1})\left(\sum_{y=3}^{n-4} \frac{y}{3}\right),$$

where table entry of a coefficient together with its a term is identified by $D_{col,row}$, a power of each a term of a $D_{col,row}$ is determined as follows: $a^{\{n+1-2(D\ col\ \#)\}}$, where the $D_{col,row}$ set of terms follows the following form:

For odd table rows:

$$f_n a^{n-1}, b_n a^{n-3}, c_n a^{n-5}, d_n a^{n-7}, \ldots, m_n a^0$$

For even table rows:

$$f_n a^{n-1}, b_n a^{n-3}, c_n a^{n-5}, d_n a^{n-7}, \ldots, (m+1)_n a^1$$

where m and m+1 represent desired selected odd and even columns for $D_{col,row}$ scaling factors, n being a number of an nth correction value, and further, where each successive composite table term $D_{col,row}$ is divided respectively by denominators for odd and even numbered correction value terms as set forth below, thereby providing $D_{col,row}$ scaling factor terms, the terms being summed to provide a summed set of $D_{col,row}$ terms, and such that each $D_{col,row}$ scaling factor term of the summed set of $D_{col,\ row}$ terms utilized in correction factor determination is of a general form: a numerator as provided by the table and scheme set forth above, and successive denominators for each numerator term of the general form:

For odd numbered correction value terms, the following denominators:

$$(1-a^2)^{n-1}, (1-a^2)^{n-2}, (1-a^2)^{n-3}, \ldots, (1-a^2)^{(n-1)/2}$$

For even number correction value terms, the following denominators:

$$(1-a^2)^{n-1}, (1-a^2)^{n-2}, (1-a^2)^{n-3}, \ldots, (1-a^2)^{n/2};$$

such that the set of summed $D_{col,row}$ terms is substantially:

$$\frac{f_n a^{n-1}}{(1-a^2)^{n-1}} + \frac{b_n a^{n-3}}{(1-a^2)^{n-2}} + \frac{c_n a^{n-5}}{(1-a^2)^{n-3}} + \ldots; \text{ and}$$

F) second combining means responsive to the second multiplication means and the third multiplication means for substantially determining a third sum of at least one of: the second product, the third product and any product determined by the third multiplication means and for assigning that third sum a sign of: positive for a selected inverse sine value determination, and negative for a selected inverse cosine value determination, thereby substantially obtaining a signed third sum.

20. The device of claim 19, further including that the fifth means includes at least fourth addition means for determining a fourth sum of at least one intermediate value and the signed third sum, that fourth sum being substantially at least one inverse trigonometric function value of the input value.

21. The device of claim 20, wherein the fourth sum is substantially at least one of: an inverse sine value of the input value, an inverse cosine value of the input value, and, where an adjusting factor determiner is further included operably coupled between the input and the modification means, an inverse tangent value of the input value.

22. The device of claim 12, wherein, when an output inverse tangent value of the input value is desired, an adjusting factor means responsive to the input means is further included for determining a fourth product such that the fourth product is substantially the input value multiplied by a factor determined by obtaining a reciprocal of a square root value of a sum of one and a square of the input value, the fourth product substantially being $$\frac{x}{\sqrt{1+x^2}},$$

where x is the input value, and such that the fourth product is substantially an adjusted input value for the modification means and the error generating means in place of the input value.

23. A device for converting an input value into at least one output value which is at least one inverse trigonometric function value of the input value, and which is a combination of an intermediate approximation value and at least one selected correction value, comprising:
   A) modification means responsive to the input value for determining an approximation value of the input value;
   B) at least one read-only memory (ROM) responsive to the modification means for determining an intermediate value, being at least one inverse trigonometric function value of the approximation value such that the at least one inverse trigonometric function value is at least one of: an inverse sine value of the approximation value and an inverse cosine value of the approximation value;
   C) correction factor generating means responsive to the input value and the modification means for determining at least one correction value; and
   D) first combining means responsive to at least the read-only memory (ROM) and the correction factor generating means for combining the intermediate approximation value and the at least one correction value such that at least one inverse trigonometric function value of the input value is obtained.

24. The device of claim 23, wherein the approximation value is selected from a predetermined set of values.

25. The device of claim 24, wherein the predetermined set of values is a group of values predetermined by selected rounding algorithms.

26. The device of claim 23, wherein the correction generating means includes first subtraction means for determining a first difference of the input value minus the approximation value, the first difference substantially being an error value.

27. The device of claim 26, wherein the correction factor generating means includes at least two of:
   A) second multiplication means, responsive to the first subtraction means and the read-only memory (ROM) for substantially determining a second product of the error value and the first scaling factor;
   B) second scaling factor generating means for substantially determining at least one of a set of scaled factors;
   C) power and factorial determining means for determining at least one of a set of power values of the error value and at least one reciprocal of a factorial value of n where n is a number of correction factor terms, and for determining an intermediate product, $c^n/n!$, thereof;
   D) secondary factor determining means for determining, where desired, at least one secondary factor $D_{col,row}$, where $D_{col,row}$ is substantially an inverse trigonometric function derivative for a selected inverse trigonometric function value such that a numerical position number of a correction factor equals the number of the derivative;
   E) third multiplication means, responsive to the power and factorial determining means and the second scaling factor generating means for substantially determining, if desired, at least a third product of at least one intermediate product ($c^n/n!$), a scaled factor (SF), and a secondary factor being a set summed terms of $D_{col,row}$ scaling factors in accordance with the concept of the following table:

| n | $D_1$ f | a | $D_2$ b | a | $D_3$ c | a | $D_4$ d | a | ... | ... |
|---|---|---|---|---|---|---|---|---|---|---|
| 1 | 1 | $a^0$ | | | | | | | | |
| 2 | 1 | $a^1$ | | | | | | | | |
| 3 | 3 | $a^2$ | 1 | $a^0$ | | | | | | |
| 4 | 15 | $a^3$ | 9 | $a^1$ | | | | | | |
| 5 | 105 | $a^4$ | 90 | $a^2$ | 9 | $a^0$ | | | | |
| 6 | 945 | $a^5$ | 1050 | $a^3$ | 225 | $a^1$ | | | | |
| 7 | 10395 | $a^6$ | 14175 | $a^4$ | 4725 | $a^2$ | 225 | $a^0$ | | |
| 8 | 135135 | $a^7$ | 218295 | $a^5$ | 99225 | $a^3$ | 11025 | $a^1$ | | |
| . | . | . | . | . | . | . | . | . | ... | ... |
| . | . | . | . | . | . | . | . | . | ... | ... |
| . | . | . | . | . | . | . | . | . | ... | ... |
| n | $f_n$ | $a^{n-1}$ | $b_n$ | $a^{n-3}$ | $c_n$ | $a^{n-5}$ | $d_n$ | $a^{n-7}$ | ... | ... | where, beginning as shown in the table, and progressing, each coefficient$_{row}$ is as follows:

$$f_n = (f_{n-1})(2n - 3) \quad \text{for } n \geq 2,$$

$$b_n = (f_{n-1})\left(\sum_{y=1}^{n-2} \frac{y}{1}\right),$$

$$c_n = (b_{n-1})\left(\sum_{y=2}^{n-3} \frac{y}{2}\right),$$

$$d_n = (c_{n-1})\left(\sum_{y=3}^{n-4} \frac{y}{3}\right),$$

where table entry of a coefficient together with its a term is identified by $D_{col,row}$, a power of each a term of a $D_{col,row}$ is determined as follows: $a^{\{n+1-2(D \text{ col } \#)\}}$, where the $D_{col,row}$ set of terms follows the following form:

For odd table rows:

$$f_n a^{n-1}, b_n a^{n-3}, c_n a^{n-5}, d_n a^{n-7}, \ldots, m_n a^0$$

For even table rows:

$$f_n a^{n-1}, b_n a^{n-3}, c_n a^{n-5}, d_n a^{n-7}, \ldots, (m+1)_n a^1$$

where m and m+1 represent desired selected odd and even columns for $D_{col,row}$ scaling factors, n being a number of an nth correction value, and further, where each successive composite table term $D_{col,row}$ is divided respectively by denominators for odd and even numbered correction value terms as set forth below, thereby providing $D_{col,row}$ scaling factor terms, the terms being summed to provide a summed set of $D_{col,row}$ terms, and such that each $D_{col,row}$ scaling factor term of the summed set of $D_{col,row}$ terms utilized in correction factor determination is of a general form: a numerator as provided by the table and scheme set forth above, and successive denominators for each numerator term of the general form:

For odd numbered correction value terms, the following denominators:

$$(1-a^2)^{n-1}, (1-a^2)^{n-2}, (1-a^2)^{n-3}, \ldots, (1-a^2)^{(n-1)/2}$$

For even number correction value terms, the following denominators:

$$(1-a^2)^{n-1}, (1-a^2)^{n-2}, (1-a^2)^{n-3}, \ldots, (1-a^2)^{n/2};$$

such that the set of summed $D_{col,row}$ terms is substantially:

$$\frac{f_n a^{n-1}}{(1-a^2)^{n-1}} + \frac{b_n a^{n-3}}{(1-a^2)^{n-2}} + \frac{c_n a^{n-5}}{(1-a^2)^{n-3}} + \ldots ; \text{ and}$$

F) second combining means responsive to the second multiplication means and the third multiplication means for substantially determining a third sum of at least one of: the second product, the third product and any product determined by the third multiplication means and for assigning that third sum a sign of: positive for a selected inverse sine value determination, and negative for a selected inverse cosine value determination, thereby substantially obtaining a signed third sum.

28. The device of claim 27, further including that the first combining means includes at least fourth addition means for determining a fourth sum of the at least one intermediate approximation value and the signed third sum, that fourth sum being substantially at least one inverse trigonometric function value of the input value.

29. The device of claim 28, wherein the fourth sum is substantially at least one of: an inverse sine value of the input value, an inverse cosine value of the input value, and, where an adjusting factor determiner is further included operably coupled between the input and the modification means, an inverse tangent value of the input value.

30. The device of claim 23, wherein the correction generating means further includes at least a first scaling factor determining means to determine at least one first scaling factor.

31. The device of claim 30, wherein the first scaling factor determining means utilizes at least one second memory device to substantially obtain at least a first scaling factor, the first scaling factor being substantially equal to $$\frac{1}{\sqrt{1-a^2}},$$

where a is the approximation value.

32. The device of claim 31, wherein the at least one second memory device is a second ROM.

33. The device of claim 23, wherein, when an output inverse tangent value of the input value is desired, an adjusting factor means responsive to the input means is further included for determining a fourth product such that the fourth product is substantially the input value multiplied by a factor determined by obtaining a reciprocal of a square root value of a sum of one and a square of the input value, the fourth product substantially being $$\frac{x}{\sqrt{1+x^2}},$$

where x is the input value, and such that the fourth product is substantially an adjusted input value for the modification means and the error generating means in place of the input value.

* * * * *